US004001580B2

United States Statutory Invention Registration [19]

[11] Reg. Number: H1580

Kluttz

[45] Published: Aug. 6, 1996

[54] ASPHALT COMPOSITION CONTAINING HIGHLY COUPLED RADIAL POLYMERS

[75] Inventor: Robert Q. Kluttz, Houston, Tex.

[73] Assignee: Shell Oil Company, Houston, Tex.

[21] Appl. No.: 336,025

[22] Filed: Nov. 8, 1994

[51] Int. Cl.[6] ..... C08K 5/07

[52] U.S. Cl. ..... 524/58; 524/68

[58] Field of Search ..... 524/68

[56] References Cited

U.S. PATENT DOCUMENTS

| | | | |
|---|---|---|---|
| H876 | 1/1991 | Gilmore | 524/68 |
| H1141 | 2/1993 | Gelles et al. | 524/68 |
| 4,115,335 | 9/1978 | Reusser et al. | 524/68 |
| 4,172,061 | 10/1979 | Bresson | 524/68 |
| 4,196,115 | 4/1980 | Bresson | 524/68 |
| 4,217,259 | 8/1980 | Bresson | 524/68 |
| 5,051,457 | 9/1991 | Gelles | 524/68 |
| 5,118,733 | 6/1992 | Gelles et al. | 524/68 |
| 5,272,214 | 12/1993 | Custro et al. | 524/68 |

FOREIGN PATENT DOCUMENTS

| | | | |
|---|---|---|---|
| 2010289 | 6/1979 | United Kingdom | 524/68 |
| 2255979 | 11/1992 | United Kingdom | 524/68 |

OTHER PUBLICATIONS

SolT161C Polymer made by Enichem.

*Primary Examiner*—Charles T. Jordan
*Assistant Examiner*—Meena Chelliah

[57] ABSTRACT

A bituminous composition comprising a compatible bituminous component and a completely non-tapered radial block copolymer of a conjugated diolefin and a vinyl aromatic hydrocarbon wherein the polymer has from 3 to 6 arms, a molecular weight of from 150,000 to 400,000, a coupling efficiency of at least 95 percent, and a polyvinyl aromatic hydrocarbon blockiness of at least 98.5%.

7 Claims, No Drawings

ASPHALT COMPOSITION CONTAINING HIGHLY COUPLED RADIAL POLYMERS

BACKGROUND OF THE INVENTION

The present invention relates to asphalt compositions containing polymers for modification of the properties of the asphalt. More particularly, this invention relates to such compositions containing new polymers which impart lower processing viscosity to the asphalt while maintaining the desired high softening point for the composition.

Asphalt is a common material utilized for the preparation of paving and roofing materials and also for coatings such as pipe coatings and tank liners. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, fillers and other materials for the modification of one or more of the physical properties of the asphalt. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance of asphalt, some only improve the low temperature performance of asphalt, while some lack thermal stability or mixing stability with asphalt.

Since the late 1960s, diene polymer rubbers such as styrene-butadiene rubber and styrene-rubber block copolymers such as styrene-butadiene-styrene and styrene-isoprene-estyrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

Such polymers have been found to be very advantageous but in some end uses, such as roll roofing membranes, high processing viscosity of blends of asphalt and such polymers leads to reduced manufacturing rates. Other attempts at lowering the processing viscosity, such as reducing molecular weight or polymer content or adding oil, have proved to be undesirable because the softening point of the composition was lowered to such an extent that adequate slump resistance could not be achieved. Also, the processing stability of blends of some of the commercially used polymers could advantageously be improved to provide a wider processing window. Therefore, it can be seen that it would be highly advantageous to have a asphalt blend which is characterized in that the ring and ball softening point is relatively high, at least 118° C. to 125° C., the processing viscosity is lower than currently possible with the popular commercially available materials, i.e., preferably less than 3000 centipoise, and the processing stability of the blend is improved such that higher processing temperatures may be used.

SUMMARY OF THE INVENTION

This invention relates to a bituminous composition with improved properties over neat asphalt. The invention is a polymer modified bituminous composition which exhibits a better balance of properties, processability, softening point, and processing stability, than previous polymer modified bituminous compositions. The bituminous composition comprises a compatible bituminous component and a completely non-tapered highly coupled radial block copolymer of a conjugated diolefin and a vinyl aromatic hydrocarbon. The radial polymer should have from 3 to 6 arms, the coupling efficiency should be at least 95 percent, the molecular weight of the polymer should be from 150,000 to 400,000, and at least 98.5% of the vinyl aromatic hydrocarbon must be contained in the vinyl aromatic hydrocarbon blocks. Specific applications of this composition include roofing materials, coatings, hot melt asphalt concrete and sealant compositions.

DETAILED DESCRIPTION OF THE INVENTION

Compatible asphalts should be used in the present invention. Asphalts with high asphaltene contents, i.e. greater than 12%, because such asphalts are generally incompatible with the polymer component. Asphaltenes are known to those skilled in the art. For purposes of this application, asphaltenes make up the n-heptane insoluble fraction of asphalt. While the polymers described herein have utility when used with incompatible asphalts, they achieve a performance advantage only with compatible asphalts, i.e. those having an asphaltene content of 12% or less.

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials.

Examples of suitable components include distillation or "straight-run bitumens," precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

Polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$RLi_n$ wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethylo 1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. However, such polymers are less efficient compared to the polymers of this invention so they are excluded from my invention. For the polymers of the present invention, the polymerization must be carried out so that at least 98.5% of the free vinyl aromatic hydrocarbon is incorporated in the polyvinyl aromatic hydrocarbon blocks and less than 1.5% is incorporated in the polydiene blocks.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Patent Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

These polymers may have a vinyl aromatic hydrocarbon content of 25 to 35 percent so that they achieve adequate properties and are sufficiently compatible with the asphalt. They should have a molecular weight of from 150,000 to 400,000 so that adequate softening points may be achieved. The radial polymers should have from 3 to 6 arms because radial polymers exhibit lower viscosity than linear polymers at equal molecular weight. The coupling efficiency of the polymer must be at least 95 percent to ensure high processing efficiency. The blockiness of the vinyl aromatic hydrocarbon, as determined by nuclear magnetic resonance, should be at least 98.5% for maximum efficiency.

If produced by sequential addition of monomer, the block copolymers have a very high coupling efficiency, usually close to 100%. Other processes require close control of the polymerization to ensure that high coupling efficiency is obtained. In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. Lower coupling efficiencies are desired herein in order to produce adhesive compositions which adhere strongly to difficult to adhere substances such as polyolefins, e.g. polyethylene. Coupling efficiency is defined as the number of molecules of coupled polymer divided by the number of molecules of coupled polymer plus the number of molecules of uncoupled polymer. Thus, when producing an ABA linear polymer, the coupling efficiency is shown by the following relationship:

$$\frac{\text{\# of molecules of } ABA}{\text{\# of molecules of } ABA \text{ plus } AB}$$

Coupling efficiency can be determined theoretically from the stoichiometric quantity of coupling agent required for complete coupling or coupling efficiency can be determined by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%. It is also within the scope of the present invention to blend polymers from processes of differing coupling efficiency. For example, if a 60% efficiency is desired, then polymers from processes having an 80% efficiency and a 40% efficiency may be blended together or a 100% triblock may be blended with a 100% diblock in a 60:40 ratio.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinylbenzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. Modern Size-Exclusion Liquid Chromatography, M. W. Yau, J. J. Kirkland, D. D. Bly, John Wiley and Sons, New York, N.Y., 1979.
2. Light Scattering From Polymer Solutions, M. B. Huglin, ed., Academic Press, New York, N.Y., 1972.
3. W. K. Kai and A. J. Havlik, Applied Optics, 12, 541 (1973).
4. M. L. McConnell, American LabOratory, 63, May, 1978.

The composition of the present invention generally comprises 100 parts by weight of a bituminous component and from 8 to 15 parts by weight per 100 parts of the composition of the radial block polymer described above. If less than 8 parts of the polymer of the invention is used, then the composition does not exhibit enhanced properties. If more than 15 parts are used, the composition may be too high in viscosity depending upon the specific polymer structure and viscosity.

The compositions of the present invention may optionally include other ingredients like fillers such as ground tires or inorganic fillers like talc, calcium carbonate and carbon black. The composition may also include resins and oils and other components such as stabilizers. It may also include other polymers, for example, other polymers of conjugated diolefins.

Hot melt asphalt concrete compositions according to the present invention are especially advantageous. Hot melt asphalt concrete compositions according to the present invention will normally contain from 80 parts to 99 parts by weight of aggregate and from 1 part to 20 parts of a bituminous composition which is generally comprised of 90 to 98 parts by weight per 100 parts of the bituminous composition of a bituminous component and from 2 parts to 10 parts by weight per 100 parts of the bituminous composition of one of the polymers discussed above. If less than 2 parts of the polymer is used, there is little or no improvement in properties and if more than 10 parts of the polymer is used, then the composition is too costly and high in viscosity. Asphalts with good flow resistance prior to polymer addition are preferred at very low polymer concentrations because at very low polymer concentrations the polymer does not contribute strongly to other properties such as rutting resistance. In other words, at low polymer concentrations, asphalts with good rutting resistance on their own are preferred.

Aggregate is basically rocks and sand. It is intended to be mixed with the bituminous composition to form the hot mix asphalt concrete. The bituminous composition is the binder which holds the aggregate together.

Roofing compositions according to the present invention are also especially advantageous. In roofing compositions designed for roll roofing membranes a composition of 85 to 92 parts asphalt and 8 to 15 parts polymer is preferred. As with HMAC compositions other additives such as inorganic fillers, resins, oils, and stabilizers may be added.

Similar compositions may be used for laminating adhesives and tab adhesives. For laminating or tab adhesives a composition of 90 to 96 parts asphalt and 4 to 10 parts polymer is preferred.

EXAMPLES

Several blends of polymer and asphalt were utilized in the following experiments. In blends 1 through 4, the asphalt was a 100 pen flux and the blends contained 20 percent talc filler. Blend 5 utilized a 200 pen flux and 30 percent filler. All of the blends contained 12.5 percent weight polymer based on asphalt.

The polymers used are: Polymer A, a styrene-butadiene-styrene (SBS) linear block copolymer having a molecular weight of 110,000 and a coupling efficiency of 84 percent and a PSC (polystyrene content, % weight) of 30 percent and a styrene blockiness of 99%; Polymer B, a 4-armed (SB) radial block copolymer with a molecular weight of 280,000 and a coupling efficiency of 84 percent and a PSC of 30 percent and a styrene blockiness of 99%; Polymer C, a 4-armed (SB) radial block copolymer with a molecular weight of 220,000 and a coupling efficiency of 95 percent and a PSC of 30 percent and a styrene blockiness of 99%; and Polymer D, a SB radial block copolymer with 4 arms, a molecular weight of 200,000, a coupling efficiency of 84 percent, a PSC of 23 percent, and a styrene blockiness of 99%.

The blends were made by addition of polymer pellets to the asphalt at 180° C. using a Silverson L4R high shear mixer to disperse the polymer. After 45 minutes, the polymer was fully digested. The filler was then added and stirred for 10 minutes. The blends were then tested for various properties. The results are shown in Table 1.

TABLE 1

| | 1<br>9.4% A<br>3.1% B | 2<br>12.5% C | 3<br>8.3% D<br>4.2% B | 4<br>12.5% B | 5<br>12.5% B |
|---|---|---|---|---|---|
| Ring & Ball softening point (°C.) | 119 | 119 | 113 | — | 125 |
| Pen (dmm) | 39 | 38 | 32 | — | 41 |
| Cold bend (°C.) | −25 | −25 | −23 | — | −25 |
| Vis @ 190° C. (cps) | 3000 | 2600 | 3800 | — | 4700 |

Desirable properties are a softening point of about 118° to 125° C., a pen value of about 30 to 40 dmm, a cold bend temperature of less than −20° C., and a viscosity as low as possible.

Blend 1 exhibits typical good properties. Blend 1 is undesirable, however, because it requires a mixture of two polymers. This adds extra handling and storage costs and increases the potential for error. Polymer A alone does not give a sufficiently high softening point.

Blend 2 is exemplary of the invention. All of the desired properties are achieved with a single polymer.

Blend 3 demonstrates another approach to reach the desired properties. Polymer D has high molecular weight, but lower than normal polystyrene content. The lower styrene content causes an unacceptable loss of softening point while the viscosity is still high.

Polymer B did not form a stable blend in the 100 pen asphalt (Blend 4). This is symptomatic of high molecular weight polymers with high styrene content in hard asphalts. For illustrative purposes a blend of Polymer B was prepared in a softer asphalt. Even in a softer asphalt Blend 5 shows the highest viscosity of any of the blends.

I claim:

1. A bituminous composition comprising a compatible bituminous component and a completely non-tapered radial block copolymer of a conjugated diolefin and a vinyl aromatic hydrocarbon wherein the block copolymer has from 3 to 6 arms, a molecular weight of from 150,000 to 400,000, a coupling efficiency of at least 95 percent, and at least 98.5% of the vinyl aromatic hydrocarbon is contained in the vinyl aromatic hydrocarbon blocks.

2. The composition of claim 1 wherein the polymer comprises from 8 parts to 15 parts by weight of the bituminous composition.

3. The composition of claim 1 wherein the polymer is hydrogenated.

4. A hot melt asphalt concrete composition comprising:

(a) from 80 parts to 99 parts by weight of aggregate, and (b) from 1 part to 20 parts by weight of the bituminous composition of claim 1.

5. The hot melt asphalt concrete composition of claim 4 wherein the bituminous composition is comprised of:

(a) from 90 parts to 98 parts by weight per 100 parts of the bituminous composition of the bituminous component, and (b) from 2 parts to 10 parts by weight per 100 parts of the bituminous composition of the polymer.

6. A roll roofing membrane comprising a membrane and the bituminous composition of claim 1.

7. The roll roofing membrane of claim 6 wherein the polymer comprises from 8 to 15 parts per 100 parts by weight of the bituminous composition.

* * * * *